United States Patent [19]

Matsumoto et al.

[11] Patent Number: 5,306,776

[45] Date of Patent: Apr. 26, 1994

[54] MULTILAYERED POLYMER

[75] Inventors: Kanki Matsumoto, Niihama; Shinji Date, Chiba, both of Japan

[73] Assignee: Sumitomo Chemical Company, Limited, Osaka, Japan

[21] Appl. No.: 53,411

[22] Filed: Apr. 28, 1993

[30] Foreign Application Priority Data

May 6, 1992 [JP] Japan ................................ 4-113502
Jun. 5, 1992 [JP] Japan ................................ 4-145325

[51] Int. Cl.$^5$ .................. C08F 265/04; C08F 265/06; C08L 51/00
[52] U.S. Cl. .................................. 525/303; 525/305; 525/309; 525/902; 525/66; 525/67; 525/70
[58] Field of Search .................. 525/303, 305, 309

[56] References Cited

U.S. PATENT DOCUMENTS

| | | | |
|---|---|---|---|
| 4,302,558 | 11/1981 | Ohya et al. | 525/218 |
| 4,315,081 | 2/1982 | Kobayashi et al. | 525/2 |
| 4,332,919 | 6/1982 | Kobayashi et al. | 524/504 |
| 4,384,078 | 5/1983 | Ohya et al. | 525/296 |
| 4,513,118 | 4/1985 | Suetterlin et al. | 525/304 |
| 4,521,568 | 6/1985 | Mori et al. | 525/309 |
| 5,247,025 | 9/1993 | Goertz et al. | 525/304 |

FOREIGN PATENT DOCUMENTS 0095769 12/1983 European Pat. Off. .
2483936 12/1981 France .
60-195143 10/1985 Japan .

*Primary Examiner*—Vasu S. Jagannathan
*Attorney, Agent, or Firm*—Sughrue, Mion, Zinn, Macpeak & Seas

[57] ABSTRACT

Disclosed are polymer having antistatic properties and having a multilayered structure comprising an innermost layer, a second layer, a third layer and an outermost layer; processes for preparing the multilayered polymer; and an antistatic resin composition comprising a thermoplastic resin and the multilayered polymer.

12 Claims, No Drawings

MULTILAYERED POLYMER

FIELD OF THE INVENTION

The present invention relates to a multilayered polymer having antistatic properties, a process for preparing the same and an antistatic resin composition containing said polymer.

PRIOR ART

In general, thermoplastic resins have a high electrical resistance, and easily become statically charged due to abrasion or peeling. This causes them to attract dust and grime which detract their appearance, or which raise problems in a number of areas when these resins are molded or used in sheets, films or fibers. To impart antistatic properties to these thermoplastic resins which are readily charged statically, various antistatic agents have been kneaded into thermoplastic resins or applied over the surface of the resins, or the resins have been subjected to surface treatments such as corona treatment, or to chemical modification by copolymerization with an antistatic monomer.

Antistatic properties should be permanent as much as possible, and antistatic agents should not contribute to the deterioration of resin properties. There have been a number of proposals involving attribution of antistatic properties to polymers For example, U.S. Pat. No. 4,302,558 and U.S. Pat. No. 4,384,078 (GB Patent No. 2036762) disclose a graft-copolymer comprising, as the inner layer, a rubber trunk polymer of conjugated diene and/or an acrylic acid ester and a polyalkylene oxide group-containing monomer, onto which trunk polymer a vinyl monomer or a vinylidene monomer is graft copolymerized. Said U.S. patents also disclose an antistatic resin composition comprising said graft copolymer and a thermoplastic resin.

As an improvement of the above antistatic resin composition, U.S. Pat. No. 4,315,081 (GB Patent No. 2070046) proposes the addition of various surfactants to the composition.

In U.S. Pat. No. 4,332,919 (DE Patent No. 3122805), an ethylenically unsaturated monomer is polymerized to form trunk polymer particles and then a conjugated diene and/or an acrylic acid ester and a polyalkylene oxide monomer are graft copolymerized thereon, and this is followed by graft polymerization of an ethylenically unsaturated monomer in order to produce a multilayered antistatic resin. Said U.S. patent also discloses an antistatic resin composition comprising said multilayered antistatic resin and a thermoplastic resin.

Japanese Unexamined Patent Publication (Kokai) No.195143/1985 discloses a polymer composite prepared by polymerizing a vinyl monomer in the presence or in the absence of a rubbery polymer and then conducting, in the presence of the resulting vinyl polymer, an emulsion polymerization of a monomer mixture primarily comprising a polyalkylene oxide chain-containing vinyl monomer. Said publication also discloses an antistatic resin composition comprising said polymer composite and a vinyl polymer.

With the antistatic methods wherein an antistatic agent is incorporated into the resin by kneading or applied over the surface of the resin, antistatic agents present therein in the vicinity of the surface or present on the surface may be washed away by water or worn off so that the antistatic effect thereof will eventually be lost. Antistatic agents can also bleed to the surface and make it sticky or attract dust and grime.

With the multilayered antistatic resins disclosed in U.S. Pat. Nos. 4,302,558, 4,384,078, 4,315,081 and 4,332,919, the polyalkylene oxide group-containing monomer used as one monomer component is effective in providing antistatic properties, but adversely affects the heat resistance and mechanical properties inherent in the resin.

SUMMARY OF THE INVENTION

The present invention provides a resin which maximizes the antistatic properties of the polyalkylene oxide group-containing monomer per unit amount used while inhibiting the decline that it causes in the resin's heat resistance and mechanical properties.

According to the present invention, there is provided a multilayered polymer comprising:

(a) about 10 to about 50% by weight of an innermost layer which is formed from a crosslinked polymer having a Tg (glass transition temperature) of 50° C. or higher, the crosslinked polymer being prepared by polymerizing a monomer mixture of about 80 to about 99.5% by weight of an ethylenically unsaturated monofunctional monomer and about 0.5 to about 20% by weight of a multifunctional monomer which contains at least 2 ethylenically unsaturated groups;

(b) about 5 to about 25% by weight of a second layer formed on the innermost layer and formed from a soft polymer having a Tg of 10° C. or lower, the soft polymer being prepared by polymerizing at least one member selected from the group consisting of conjugated dienes and acrylic acid esters;

(c) about 10 to about 40% by weight of a third layer formed on the second layer and formed from a polymer having a Tg of 10° C. or lower, the polymer being prepared by polymerizing an unsaturated monomer comprising at least 25% by weight of a polyalkylene oxide chain-containing unsaturated monofunctional monomer; and (d) about 10 to about 50% by weight of an outermost layer formed on the third layer and formed from a polymer having a Tg of 50° C. or higher, the polymer being prepared by polymerizing an ethylenically unsaturated monofunctional monomer.

The present invention also provides a multilayered polymer comprising:

(a) about 10 to about 50% by weight of an innermost layer which is formed from a crosslinked polymer having a Tg of 50° C. or higher, the crosslinked polymer being prepared by polymerizing a monomer mixture of about 80 to about 99.5% by weight of an ethylenically unsaturated monofunctional monomer and about 0.5 to about 20% by weight of a multifunctional monomer which contains at least 2 ethylenically unsaturated groups;

(b) about 5 to about 25% by weight of a second layer formed on the innermost layer and formed from a soft polymer having a Tg of 10° C. or lower, the soft polymer being prepared by polymerizing at least one member selected from the group consisting of conjugated dienes and acrylic acid esters;

(c) about 10 to about 40% by weight of a third layer formed on the second layer and formed from a soft polymer having a Tg of 10° C. or lower, the soft polymer being prepared by polymerizing a monomer mixture of (i) about 25 to about 45% by weight of a polyalkylene oxide chain-containing unsaturated monofunctional monomer, (ii) about 70 to about 50% by weight of at least one monomer selected from the group consisting of conjugated dienes and acrylic acid esters and (iii) about 5 to about 10% by weight of an organic compound containing at least one ethylenically unsaturated group and at least one hydrophilic group; and (d) about 10 to about 50% by weight of an outermost layer formed on the third layer and formed from a polymer having a Tg of 50° C. or higher, the polymer being prepared by polymerizing an ethylenically unsaturated monofunctional monomer.

The present invention also provides a process for preparing a multilayered polymer comprising an innermost layer, a second layer formed on the innermost layer, a third layer formed on the second layer and an outermost layer formed on the third layer, the process comprising the steps of:

(A) forming polymer particles serving as the innermost layer by polymerizing in an aqueous medium a monomer mixture of about 80 to about 99.5% by weight of an ethylenically unsaturated monofunctional monomer and about 0.5 to about 20% by weight of a multifunctional monomer containing at least 2 ethylenically unsaturated groups;

(B) forming two-layered polymer particles by polymerizing, in an aqueous medium containing said innermost layer polymer particles, at least one member selected from the group consisting of conjugated dienes and acrylic acid esters to form the second layer over the innermost layer polymer particles;

(C) forming three-layered polymer particles by polymerizing, in an aqueous medium containing said two-layered polymer particles, an unsaturated monomer comprising at least 25% by weight of a polyalkylene oxide chain-containing unsaturated monofunctional monomer to form the third layer over the two-layered polymer particles; and (D) forming the outermost layer over the three-layered polymer particles by polymerizing at least one ethylenically unsaturated monofunctional monomer in an aqueous medium containing said three-layered polymer particles;

wherein the weight ratios of the amounts of the monomers used in each of the steps are such that, based on the total weight of the monomers used, (A) the amount of the monomers used for forming the innermost layer in step (A) is about 10 to about 50% by weight, (B) the amount of the monomer(s) used for forming the second layer in step (B) is about 5 to about 25% by weight, (C) the amount of the monomer(s) used for forming the third layer in step (C) is about 10 to about 40% by weight, and (D) the amount of the monomer(s) used for forming the outermost layer in step (D) is about 10 to about 50% by weight.

The present invention further provides a process for preparing a multilayered polymer comprising an innermost layer, a second layer formed on the innermost layer, a third layer formed on the second layer and an outermost layer formed on the third layer, the process comprising the steps of:

(A) forming polymer particles which serve as the innermost layer by polymerizing in an aqueous medium a mixture of about 80 to about 99.5% by weight of an ethylenically unsaturated monofunctional monomer and about 0.5 to about 20% by weight of a multifunctional monomer containing at least 2 ethylenically unsaturated groups;

(B) forming two-layered polymer particles by polymerizing, in an aqueous medium containing said innermost layer polymer particles, at least one member selected from the group consisting of conjugated dienes and acrylic acid esters to form the second layer over the innermost layer polymer particles;

(C) forming three-layered polymer particles by polymerizing, in an aqueous medium containing said two-layered polymer particles, a monomer mixture of (i) about 25 to about 45% by weight of a polyalkylene oxide chain-containing unsaturated monofunctional monomer, (ii) about 70 to about 50% by weight of at least one monomer selected from the group consisting of conjugated dienes and acrylic acid esters and (iii) about 5 to about 10% by weight of an organic compound containing at least one ethylenically unsaturated group and at least one hydrophilic group in the molecule to form the third layer over the two-layered polymer particles; and (D) forming the outermost layer over the three-layered polymer particles by polymerizing at least one ethylenically unsaturated monofunctional monomer in an aqueous medium containing said three-layered polymer particles;

wherein the weight ratios of the amounts of the monomers used in each of the steps are such that, based on the total weight of the monomers used, (A) the amount of the monomers used for forming the innermost layer in step (A) is about 10 to about 50% by weight, (B) the amount of the monomer(s) used for forming the second layer in step (B) is about 5 to about 25% by weight, (C) the amount of the monomer(s) used for forming the third layer in step (C) is about 10 to about 40% by weight, and (D) the amount of the monomer(s) used for forming the outermost layer in step (D) is about 10 to about 50% by weight.

The present invention additionally provides an antistatic resin composition comprising about 100 parts by weight of a thermoplastic resin and about 40 to about 100 parts by weight of said multilayered polymer.

DETAILED DESCRIPTION OF THE INVENTION

(a) Innermost Layer

The ethylenically unsaturated monofunctional monomer used to form the innermost layer in the multilayered polymer of the invention is a monomer which forms the so-called rigid polymer and contains one ethylenically unsaturated group (functional group) per molecule. Examples of such monomer are alkyl (e.g. $C_1$–$C_4$) esters of (meth)acrylic acid such as methyl methacrylate; vinyl compounds such as (meth)acrylamide, vinyl chloride, vinyl acetate and acrylonitrile; aromatic vinyl compounds such as styrene; and alkyl (e.g. $C_1$–$C_4$) vinyl ether, alkyl (e.g. $C_1$–$C_4$) vinyl ketone, 2-hydroxyalkyl (meth)acrylic acid ester, particularly $C_1$–$C_4$ 2-hydroxyalkyl esters (meth)acrylic acid, and vinylidene chloride. These monomers can be used singly or at least two of them may be used in combination. Of these, a monomer mixture containing more than 70% by weight of methyl methacrylate and less than 30% by weight of a monomer selected from the group consisting of alkyl (e.g. $C_1$-$C_4$) esters of acrylic acid and styrene.

Examples of the multifunctional monomer having at least 2 ethylenically unsaturated groups are diesters formed by esterifying both of the terminal hydroxyl groups of ethylene glycol or an oligomer thereof (e.g. HO-$(CH_2CH_2O)_n$-H wherein n is an integer of 2 to 10) with acrylic acid or methacrylic acid, such as ethylene glycol di(meth)acrylate, diethylene glycol di(meth)acrylate, triethylene glycol di(meth)acrylate, tetraethylene glycol di(meth)acrylate, nonaethylene glycol di(meth)acrylate and tetradecaethylene glycol di(meth)acrylate; esters formed by esterifying two hydroxyl groups of a dihydric alcohol, particularly dihydric alcohol having 2 to 10 carbon atoms, with acrylic acid or methacrylic acid, such as neopentyl glycol di(meth)acrylate, hexanediol di(meth)acrylate and butanediol di(meth)acrylate; diesters formed by esterifying with acrylic acid or methacrylic acid both of the two terminal hydroxyl groups of bisphenol A or an alkylene oxide adduct of bisphenol A, especially an alkylene oxide adduct (HO-$(AO)_m$—H wherein A is $C_2$-$C_3$ alkylene and m is an integer of 1-10) of bisphenol A, each of which may be substituted with at least one halogen atom; esters formed by esterifying with acrylic acid or methacrylic acid an alcohol having at least 3 hydroxyl groups, particularly a polyhydric alcohol having 5 to 20 carbon atoms and 3 to 6 hydroxyl groups, such as trimethylol propane, pentaerythritol and dipentaerythritol; compounds formed by ring opening addition of the epoxy group of glycidyl acrylate or glycidyl methacrylate to the terminal hydroxyl groups of the abovementioned dihydric or polyhydric alcohol; compounds formed by ring opening addition of the epoxy group of glycidyl acrylate or glycidyl methacrylate to a dibasic acid (which may be substituted with at least one halogen atom), such as succinic acid, adipic acid, terephthalic acid or phthalic acid or to an alkylene oxide adducts thereof, especially an alkylene oxide adduct (HO—$(AO)_m$—H wherein A is $C_2$-$C_3$ alkylene and m is an integer of 1 to 10) of such optionally halogen-substituted dibasic acid; allyl methacrylate; divinyl benzene; etc. These monomers are known and readily available. They can be used singly or at least two of them are usable in combination.

The foregoing multifunctional monomer acts as a crosslinking agent and is used in an amount sufficient to effectively form a crosslinked structure for the innermost layer. It is usually used in an amount of about 0.5 to about 20% by weight, preferably about 0.5 to about 10% by weight, based on the total weight of the monomers used for forming the innermost layer.

The innermost layer polymer having a Tg (glass transition temperature) of 50° C. or higher is the so-called hard or rigid polymer. It is preferable that the innermost layer has a Tg of about 50° to about 120° C.

The Tg value of the innermost layer polymer as well as the Tg values of the second, third and outermost layers can be measured by polymerizing the respective constituent monomers independently and measuring Tg of the resulting polymer. Thus, the suitable monomers and their proportions can be selected by determining the relationship of the proportions of the candidate monomers and the Tg value of the polymer prepared from the candidate monomers.

In the specification and claims, Tg is determined according to ASTM-D-3418 with use of a differential scanning calorimeter (model DS-10, manufactured by Seiko Denshi Kogyo Co.).

The function of the innermost layer in the multilayered polymer is to prevent the multilayered polymer from breaking or being crushed during processing and to prevent the decline of the heat resistance and mechanical strength of a resin composition containing said multilayered polymer. To do this, the innermost layer should be present in an amount of about 10 to about 50% by weight, preferably about 20 to about 50% by weight, more preferably about 30 to about 40% by weight, based on the multilayered polymer of the invention. An excessive proportion of the innermost layer tends to reduce the processability.

(b) Second Layer

The second layer is formed from a soft polymer having a Tg of 10° C. or lower, preferably of about −70° to 10° C. The soft polymer is one prepared primarily from an alkyl (e.g. $C_1$-$C_{15}$) ester of acrylic acid such as methyl acrylate, ethyl acrylate, propyl acrylate, butyl acrylate, octyl acrylate or nonyl acrylate, or conjugated diene such as 1,3-butadiene, isoprene, 1,3-pentadiene, chloroprene or the like. Optionally other monomers which are copolymerizable with the aforesaid alkyl ester of acrylic acid or conjugated diene may be used in an amount effective for giving a copolymer having a Tg of 10° C. or lower, preferably about −70° to 10° C. Said other copolymerizable monomers include, for example, styrene, acrylonitrile, ethylene, propylene, and alkyl (e.g. $C_1$-$C_8$) esters of methacrylic acid.

The function of the second layer is to apparently increase the volume of the third layer so that the desired degree of antistatic properties can be imparted even with use of a small proportion of the third layer. In other words, when the multilayered polymer is added to a thermoplastic resin to impart antistatic properties, the second layer functions to allow the composition to exhibit sufficient antistatic properties even when using a small amount of the multilayered polymer. To accomplish this function, the second layer accounts for about 5 to about 25% by weight, preferably about 5 to about 15% by weight, more preferably about 5 to about 10% by weight, of the multilayered polymer. An excessive proportion of the second layer tends to decrease the heat resistance and the mechanical strength of the multilayered polymer itself or of a thermoplastic resin having the multilayered polymer particles as dispersed therein.

(C) Third Layer

The third layer is formed from a polymer having a Tg of 10° C. or lower, preferably about −70° to 10° C., and the polymer is composed primarily of a polyalkylene oxide chain-containing unsaturated monofunctional monomer units.

The third layer may be formed from a polymer of the polyalkylene oxide chain-containing unsaturated monofunctional monomer alone. Since said monofunctional momomer has a relatively low polymerization reactivity, the third layer may be formed from a copolymer prepared by copolymerizing said monofunctional monomer and other unsaturated monomer having a high polymerization reactivity. Such other unsaturated monomer to be copolymerized with said monofunctional monomer, when thus copolymerized, should give a copolymer having a Tg of 10° C. or lower. Useful as such copolymerizable monomer are, for example, those exemplified with respect to the monomers for forming the second layer. The proportion of the polyalkylene oxide chain-containing unsaturated monofunctional monomer units in the copolymer of the third layer is at least 25% by weight, preferably at least 40% by weight, more preferably at least 50% by weight.

In a preferred embodiment of the invention, the third layer is formed from a soft polymer having a Tg of 10° C. or lower, preferably about −70° to 10° C., wherein said soft polymer is prepared by polymerizing a monomer mixture of (i) a polyalkylene oxide chain-containing unsaturated monofunctional monomer, (ii) at least one monomer selected from the group consisting of conjugated dienes and acrylic acid esters, and (iii) an organic compound containing at least one ethylenically unsaturated group and at least one hydrophilic group.

In the aforesaid preferred embodiment of the third layer, based on the total amount of the monomers, the polyalkylene oxide chain-containing unsaturated monofunctional monomer is used in a proportion of about 25 to about 45% by weight, preferably about 25 to about 40% by weight; said at least one monomer selected from the group consisting of conjugated dienes and acrylic acid esters is (are) used in a proportion of about 70 to about 50% by weight, preferably about 70 to about 55% by weight; and the organic compound containing at least one ethylenically unsaturated group and at least one hydrophilic group is used in a proportion of about 5 to about 10% by weight.

Examples of the polyalkylene oxide chain-containing unsaturated monofunctional monomers include, for example, those having a polyalkylene oxide chain and an unsaturated double bond on one end of said polyalkylene oxide chain. Such monomer having an unsaturated double bond includes a monomer represented by the formula

$$D-O-(RO)_n-X \qquad (1)$$

wherein D is a group having an unsaturated double bond, such as a vinyl group, an allyl group, a (meth)acryloyl group or the like, R is an alkylene group having 1 to 4 carbon atoms, n is an integer of approximately 5 to 50, preferably 9 to 25, X is not critical and can be any of a hydrogen atom, a hydrocarbon group having 9 or less carbon atoms, a sulfonic acid group, a carboxylic acid group, a phosphoric acid group and salts of these acid groups, such as sodium salts, potassium salts, ammonium salts and the like.

The polyalkylene oxide chain-containing unsaturated monofunctional monomers are known and are readily available. Preferred examples of such monomers are polyethylene glycol (meth)acrylate, methoxypolyethylene glycol (meth)acrylate and polyethylene glycol (meth)acrylate sulfonate, in each of which the polyethylene glycol moiety has about 6 to about 25 repeating units of ethylene oxide.

As said at least one monomer selected from conjugated dienes and acrylic acid esters, the monomers exemplified with respect to the monomers for forming the second layer are preferably usable in the preferred embodiment.

The organic compound containing at least one ethylenically unsaturated group and at least one hydrophilic group is preferably one containing a hydrophilic group such as a sulfonic acid salt group, a carboxylic acid salt group, or a phosphoric acid salt group. Preferred are organic compounds having a sulfonic acid salt group in view of high antistatic effect. Examples of the salts are Na salt, K salt or other alkali metal salts as well as ammonium salt.

Preferable examples of said organic compound are (meth)allyl ester sulfonic acid salt of an unsaturated dicarboxylate, especifically $C_4-C_{15}$ alkyl (meth)allyl sulfosuccinate salts, such as sodium lauryl (meth)allyl sulfosuccinate, sodium hexadecyl (meth)allyl sulfosuccinate, and $(C_4-C_{15}$ alkyl)phenyl (meth)allyl sulfosuccinate salts such as potassium octylphenyl (meth)allyl sulfossucinate.

Also usable as said organic compound are aromatic vinyl sulfonic acid salts such as sodium styrene sulfonate, ammonium 3-vinyl toluene sulfonate, etc.

Further usable as said organic compound are aliphatic vinyl sulfonic acid salts such as sodium vinyl sulfonate, acrylic sulfonic acid salts such as sodium (meth)acrylamide alkane(e.g. $C_4-C_{20}$) sulfonate, etc. Other useful organic compound includes unsaturated monocarboxylate sulfonic acid salts such as sodium 2-sulfoethyl acrylate, sodium 2-sulfoethyl α-ethyl-acrylate and the like.

These organic compounds containing at least one ethylenically unsaturated group and at least one hydrophilic group are known and readily available. They can be used singly or at least two of them are usable in mixture.

The third layer imparts antistatic properties to the multilayered polymer. The proportion of the third layer in the multilayered polymer of the invention is about 10 to about 40% by weight, preferably about 15 to about 30% by weight.

(d) Outermost Layer

The outermost layer is formed from a hard or rigid polymer having a Tg of about 50° C. or higher, preferably about 50° to about 120 ° C., and is prepared by polymerizing an ethylenically unsaturated monofunctional monomer. Examples of useful monomer include the ethylenically unsaturated monofunctional monomer used to form the innermost layer.

The outermost layer serves to render the multilayered polymer compatible with the thermoplastic resin to which the multilayered polymer is added. The type of monomer selected, therefore, would depend upon the intended use of the resin composition.

The outermost layer accounts for about 10 to about 50% by weight, preferably about 20 to about 50% by weight, based on the multilayered polymer.

The particle size of the multilayered polymer ranging from about 0.05 μm to about 1 μm is suitable for dispersing the polymer in the thermoplastic resin.

The multilayered polymer of this invention is prepared, for example, by forming the innermost, second, third and outermost layers in an aqueous medium by successive monomer addition and polymerization to deposit each layer over the previous one.

For example, a conventional emulsifier and a conventional water-soluble polymerization initiator may be used for successive emulsion polymerization. Or it is also possible to form the innermost layer alone by micro-suspension polymerization using an emulsifier and an oil-soluble polymerization initiator, followed by subsequent successive emulsion polymerizations using a water-soluble polymerization initiator.

Examples of useful emulsifiers include anionic, cationic and nonionic emulsifiers. Generally, anionic emulsifiers are preferred. Among the emulsifiers, particularly preferred are alkylsulfonic acid salts, alkylbenzenesulfonic acid salts, alkylnaphthalenesulfonic acid salts, alkylphosphoric acid salts, polyoxyethylene alkyl ether sulfate salts, in each of which the alkyl moiety has 8 to 16 carbon atoms, as well as dialkylsulfosuccinate salts wherein the alkyl moiety has 4 to 16 carbon atoms. These salts may be sodium salts, potassium salts or ammonium salts.

Initiators to be used in the emulsion polymerization include water-soluble peroxides and water-soluble persulfates such as hydrogen peroxide and sodium persulfate; and redox initiators comprising an oxidizing agent such as hydrogen peroxide or sodium persulfate and a water-soluble reducing agent such as sulfites, hydrogensulfites, sodium formaldehyde-sulfoxylate or ferrous salts. Initiators to be used in the microsuspension polymerization include oil-soluble peroxides such as benzoyl peroxide, lauroyl peroxide, cumene hydroperoxide or t-butyl peroxylaurate; and redox initiators comprising such an oil-soluble peroxide and a water-soluble reducing agent such as one mentioned above.

In the polymerization for the third layer, the organic compound containing at least one ethylenically unsaturated group and at least one hydrophilic group also acts as an emulsifier, so that the addition of an emulsifier can be omitted or the addition thereof in a small amount will be sufficient for the polymerization.

The polymerization temperature may be selected depending on the initiators used, and generally ranges from about 30° to about 90° C. Polymerization is conducted until the completion of the desired polymerization reactions and the total reaction time may range from about 30 minutes to about 30 hours, although widely variable depending on the monomers used, and other conditions.

In conducting the polymerization for the second, third and outermost layers, the monomers, initiators, water and if desired emusifiers may be added to the reaction system at once or continuously or intermittently.

In any case, monomers are polymerized by a per se conventional method which is selected depending on the type and weight ratios of the monomers used, so as to form the desired innermost, second, third and outermost layers.

Since the polymerization yield of each of the monomers used is nearly 100%, the weight ratios of the innermost, second, third and outermost layers are substantially identical with the weight ratios of the monomers charged. Furthermore, when copolymerization is conducted, the weight ratios of the constituent comonomers fed to the reaction system substantially correspond to the weight ratios of the comonomer units present in the resulting copolymer.

Thus, the weight ratios of the amounts of the monomers used in each of the steps are such that, based on the total weight of the monomers used, (A) the amount of the monomers used for forming the innermost layer in step (A) is about 10 to about 50% by weight, preferably about 20 to about 50% by weight, (B) the amount of the monomer(s) used for forming the second layer in step (B) is about 5 to about 25% by weight, preferably about 5 to about 15% by weight, (C) the amount of the monomer(s) used for forming the third layer in step (C) is about 10 to about 40% by weight, preferably about 15 to about 30% by weight, and (D) the amount of the monomer(s) used for forming the outermost layer in step (D) is about 10 to about 50% by weight, preferably about 20 to about 50% by weight.

After completion of the polymerization reactions, the resulting multilayered polymer of the invention can be isolated by conventional methods. For example, a metal salt such as $CaCl_2$, $MgSO_4$ or $Al_2(SO_4)_3$ is added to the resulting polymer latex for conducting the salting-out of the resulting multilayered polymer particles, which are then separated and dried in a conventional manner. Alternatively, the resulting polymer latex may be spray-dried to obtain the desired multilayered polymer particles.

A suitable particle size of said multilayered polymer obtained by the above methods ranges from about 0.05 $\mu$m to about 1 $\mu$m, as already mentioned.

The multilayered polymer obtained by the above methods may be molded as it is, or may be molded as mixed with the thermoplastic resin to impart antistatic properties to the resin.

Thus, the present invention provides an antistatic resin composition comprising a thermoplastic resin and a multilayered polymer of the invention.

There is no particular restriction upon the kind of thermoplastic resin. Yet preferred are styrene resins, polyethylene, polypropylene, vinyl chloride resins, acrylic resins such as homopolymer or copolymer of methyl methacrylate, polyamide resins, polycarbonate resins, acrylonitrile resins and the like. Among them, more preferable are those which have good compatibility with the polymer constituting the outermost layer of the multilayered polymer.

The amount of said multilayered polymer is about 40 to 100 parts by weight, preferably about 50 to 80 parts by weight, per 100 parts by weight of the thermoplastic resin. The actual mixing ratio within this range is determined so as to achieve good balance between the desired antistatic properties and the desired mechanical strength and heat resistance.

Any of conventional mixing methods can be used to produce the antistatic resin composition from the multilayered polymer and the thermoplastic resin. For example, the mixing may be accomplished by a V-type blender, a Henschel mixer, a tumbler or the like, followed by kneading in a molten state with use of mixing rollers, a Banbury mixer, a single or double screw extrusion machine or the like. Alternatively, the multilayered polymer may be dispersed in a syrup of a monomer or monomers to be used for preparing the thermoplastic resin and then the dispersion may be subjected to suspension or bulk polymerization of said monomer(s).

In the mixing process, it is possible to add stabilizers, lubricants, plasticizers, pigments or dyes, fillers, and the like, if so desired.

The resulting resin composition may be molded by various conventional methods for molding thermoplastic resins.

According to the present invention, the multilayered polymers of this invention is incorporated or dispersed in the thermoplastic resin, whereby the thermoplastic resin is given excellent antistatic properties without undergoing marked change in its inherent resin properties. Furthermore, the antistatic properties thus imparted are not reduced by its contact with water or other substances or by abrasion.

EXAMPLES

The present invention will be described below in further detail with reference to the following examples. The parts and the percentages in the examples are all by weight. In the examples, the physical properties were evaluated by the following methods:

(i) Charged voltage half-life

A sample, 50 mm × 50 mm × 3 mm, was left to stand at 23° C. at 50% relative humidity for 24 hours and then, the charged voltage half-life was measured in the same atmosphere using a static meter (tradename "Static Honest Meter", manufactured by Shishido Shokai) under conditions of an applied charge of 10 kv, application time of 1 minute and table rotation of 1300 rpm.

(ii) Specific surface and volume resistivity

A sample, 50 mm × 50 mm × 3 mm, was left to stand at 23° C. at 50% relative humidity for 24 hours and then, the specific surface and volume resistivities were measured in the same atmosphere using an insulation meter (SM-10E made by Toa Dempa Industries KK).

(iii) Heat deformation temperature (HDT): Measured according to ASTM D638 using a test piece annealed for 3 hours at 90° C.

(iv) Bending modulus: Measured according to ASTM D-790.

EXAMPLE 1

(A) A polymerization vessel equipped with a reflux condenser was charged with 225 parts of water. After purging with nitrogen and while stirring, a mixture of 20 parts of methyl methacrylate, 0.2 part of divinylbenzene, 0.2 part of sodium dodecylbenzene-sulfonate, 26 parts of water and 0.05 part of sodium persulfate was added and the obtained mixture was subjected to a polymerization reaction at 70° C. for 1 hour to form an innermost layer, which had a Tg of 103° C.

(B) Next, to the polymer latex obtained in (A) above were added 4 parts of butyl acrylate, 0.1 part of sodium dodecylbenzenesulfonate, 10 parts of water and 0.05 part of sodium persulfate, and polymerization was conducted at 70° C. for 3 hours to form a second layer, which had a Tg of −54° C., over the innermost layer polymer particles, whereby two-layered polymer particles were obtained.

(C) Next, to the polymer latex obtained in (B) above were added 8 parts of butyl acrylate, 8 parts of methoxypolyethylene glycol monomethacrylate (the number of ethylene oxide units = 16), 0.1 part of sodium dodecyl-benzenesulfonate, 10 parts of water and 0.07 part of sodium persulfate, and polymerization was conducted at 70° C. for 3 hours to form a third layer, which had a Tg of −62° C, over the two-layered polymer particles, whereby three-layered polymer particles were obtained.

(D) Next, to the polymer latex obtained in (C) above were added 20 parts of methyl methacrylate, 0.2 part of lauryl mercaptan, 0.2 part of sodium dodecylbenzene-sulfonate, 25 parts of water and 0.02 part of sodium persulfate, and polymerization was conducted at 70° C. for 1 hour to form an outermost layer, which had a Tg of 102° C., over the three-layered polymer particles.

The resulting polymer latex was salted out using an aqueous solution of magnesium sulfate, dehydrated, washed and dried to obtain a four-layered polymer.

40 parts of the resulting multilayered polymer were mixed with 60 parts of methacrylic resin beads obtained by suspension polymerization (tradename "Sumipex B MHO", made by Sumitomo Chemical Co., LTD.) using a Henshel mixer, and then the mixture was extruded through a 20 mm diameter vented single screw extruder (made by Toyo Precision Instruments) at a cylinder temperature of 200°–250° C. to form pellets. The pellets were injection molded into the test samples (using an M-140 injection molding machine made by Meiki Seisakusho). The evaluation results are shown in Table 1 below.

COMPARATIVE EXAMPLE 1

The procedure of Example 1 was repeated with the exception that, instead of forming the second and third layers as in Example 1, a second layer (Tg: −60° C.) was formed by adding to the polymer latex obtained in step (A) 12 parts of butyl acrylate, 8 parts of methoxypolyethylene glycol monomethacrylate (the number of ethylene oxide units = 16), 0.2 part of sodium dodecylbenzenesulfonate, 20 parts of water and 0.1 part of sodium persulfate, and conducting polymerization for 5 hours, whereby a three-layered polymer was obtained. The obtained polymer was treated and evaluated in the same manner as in Example 1. The evaluation results are shown in Table 1.

EXAMPLE 2

The procedure of Example 1 was repeated with the exception that 5 parts of methoxypolyethylene glycol monomethacrylate were used instead of 8 parts thereof to form a third layer. The resulting third layer had a Tg of −60° C. The obtained four-layered polymer was treated and evaluated in the same manner as in Example 1. The evaluation results are shown in Table 1.

COMPARATIVE EXAMPLE 2

The procedure of Comparative Example 1 was repeated with the exception that 5 parts of methoxypolyethylene glycol monomethacrylate were used instead of 8 parts thereof to form a second layer. The resulting second layer had a Tg of −59° C. The obtained three-layered polymer was treated and evaluated in the same manner as in Example 1. The evaluation results are shown in Table 1.

TABLE 1

|  | Specific surface resistivity ($\times 10^{11}$)Ω | Specific volume resistivity ($\times 10^{11}$)Ω | Charged voltage half-life (sec) | HDT (°C.) | Bending modulus (kg/cm$^2$) | Particle size (μ) |
|---|---|---|---|---|---|---|
| Example 1 | 1.7 | 0.46 | 2 | 86.0 | 17000 | 0.25 |
| Example 2 | 8.0 | 2.0 | 4 | 91.0 | 18140 | 0.25 |
| Comp. Ex. 1 | 9.0 | 2.5 | 5 | 86.7 | 16700 | 0.25 |
| Comp. Ex. 2 | 30.0 | 9.0 | 9 | 89.1 | 18100 | 0.24 |
| Blank | 1000.0 | 1000.0 | ∞ | 104 | 32000 | — |

Table 1 shows the following. Compared with the corresponding test sample obtained in Comparative Example 1, the test sample obtained in Example 1 is superior in antistatic properties, i.e., specific surface resistivity, specific volume resistivity and charged voltage half-life, and comparable in HDT and bending modulus.

Compared with the corresponding test sample obtained in Comparative Example 2, the test sample obtained in Example 2 is superior in specific surface resistivity, specific volume resistivity and charged voltage half-life, and is comparable in HDT and bending modulus.

Compared with blank (i.e., methacrylic resin used in Example 1 but containing no multilayered polymer), the test samples containing the multilayered polymer has reduced HDT and bending modulus. Yet, the multilayered polymers of the invention cause small degree of reduction in HDT and bending modulus and impart considerably improved antistatic properties to the resin composition.

EXAMPLE 3

(A) A polymerization vessel equipped with a reflux condenser was charged with 225 parts of water. After purging with nitrogen and while stirring, a mixture of 19 parts of methyl methacrylate, 1 part of ethyl acrylate, 0.2 part of divinylbenzene, 0.2 part of sodium dodecylbenzenesulfonate, 26 parts of water and 0.05 part of sodium persulfate was added and the obtained mixture was subjected to a polymerization reaction at 70° C. for 1 hour to form an innermost layer, which had a Tg of 100° C.

(B) Next, to the polymer latex obtained in (A) above were added 4 parts of butyl acrylate, 0.1 part of sodium dodecylbenzenesulfonate, 10 parts of water and 0.05 part of sodium persulfate, and the polymerization was conducted at 70° C. for 3 hours to form a second layer, which had a Tg of −54 ° C., over the innermost layer polymer particles, whereby two-layered polymer particles were obtained.

(C) Next, to the polymer latex obtained in (B) above were added 8 parts of butyl acrylate, 5 parts of methoxypolyethylene glycol monomethacrylate (the number of ethylene oxide unit = 16), 1 part of sodium alkyl (13 carbon atoms) allyl sulfosuccinate, 10 parts of water and 0.07 part of sodium persulfate, and the polymerization was conducted at 70° C. for 3 hours to form a third layer, which had a Tg of −65° C., over the two-layered polymer particles, whereby three-layered polymer particles were obtained.

(D) Next, to the polymer latex obtained in (C) above were added 20 parts of methyl methacrylate, 0.2 part of lauryl mercaptan, 0.2 part of sodium dodecylbenzenesulfonate, 25 parts of water and 0.02 part of sodium persulfate, and the polymerization was conducted at 70° C. for 1 hour to form an outermost layer, which had a Tg of 101° C., over the three-layered polymer particles.

The resulting polymer latex was salted out using an aqueous solution of magnesium sulfate, dehydrated, washed and dried to obtain a four-layered polymer.

40 parts of the resulting multilayered polymer were mixed with 60 parts of methacrylic resin beads obtained by suspension polymerization (Sumipex B MHO made by Sumitomo Chemical Co., LTD) using a Henshel mixer, and then the mixture were extruded through a 20 mm diameter vented single screw extruder (made by Toyo Precision Instruments) at a cylinder temperature of 200°–250° C. to form pellets. The pellets were injection molded into the test samples (using an M-140 injection molding machine made by Meiki Seisakusho). The evaluation results are shown in Table 2.

EXAMPLE 4

The procedure of Example 3 was repeated with the exception that 3 parts of methoxypolyethylene glycol monomethacrylate were used instead of 5 parts thereof to form a third layer. The resulting third layer had a Tg of −58° C. The obtained polymer was treated and evaluated in the same manner as in Example 3. The evaluation results were shown in Table 2.

TABLE 2

|  | Specific surface resistivity ($\times 10^{11}$)Ω | Specific volume resistivity ($\times 10^{11}$)Ω | Charged voltage half-life (sec) | HDT (°C.) | Bending modulus (kg/cm$^2$) | Particle size (μ) |
|---|---|---|---|---|---|---|
| Example 3 | 1.0 | 0.8 | 5 | 89.4 | 16900 | 0.26 |
| Example 4 | 20.0 | 6.0 | 15 | 93.6 | 18100 | 0.25 |

We claim:

1. A multilayered polymer comprising:
   (a) about 10 to about 50% by weight of an innermost layer which is formed from a crosslinked polymer having a glass transition temperature (Tg) of 50° C. or higher, the crosslinked polymer being prepared by polymerizing a monomer mixture of about 80 to about 99.5% by weight of an ethylenically unsaturated monofunctional monomer and about 0.5 to about 20% by weight of a multifunctional monomer which contains at least 2 ethylenically unsaturated groups;
   (b) about 5 to about 25% by weight of a second layer formed on the innermost layer and formed from a soft polymer having a Tg of 10° C. or lower, the soft polymer being prepared by polymerizing at least one member selected from the group consisting of conjugated dienes and acrylic acid esters;
   (c) about 10 to about 40% by weight of a third layer formed on the second layer and formed from a polymer having a Tg of 10° C. or lower, the polymer being prepared by polymerizing an unsaturated monomer comprising at least 25% by weight of a polyalkylene oxide chain-containing unsaturated monofunctional monomer; and
   (d) about 10 to about 50% by weight of an outermost layer formed on the third layer and formed from a polymer having a Tg of 50° C. or higher, the polymer being prepared by polymerizing an ethylenically unsaturated monofunctional monomer.

2. A multilayered polymer according to claim 1, which comprises:
   (a) about 10 to about 50% by weight of an innermost layer which is formed from a crosslinked polymer having a Tg of 50° C. or higher, the crosslinked polymer being prepared by polymerizing a monomer mixture of about 80 to about 99.5% by weight of an ethylenically unsaturated monofunctional monomer and about 0.5 to about 20% by weight of a multifunctional monomer which contains at least 2 ethylenically unsaturated groups;
   (b) about 5 to about 25% by weight of a second layer formed on the innermost layer and formed from a soft polymer having a Tg of 10° C. or lower, the soft polymer being prepared by polymerizing at least one member selected from the group consisting of conjugated dienes and acrylic acid esters;

(c) about 10 to about 40% by weight of a third layer formed on the second layer and formed from a soft polymer having a Tg of 10° C. or lower, the soft polymer being prepared by polymerizing a monomer mixture of (i) about 25 to about 45% by weight of a polyalkylene oxide chain-containing unsaturated monofunctional monomer, (ii) about 70 to about 50% by weight of at least one monomer selected from the group consisting of conjugated dienes and acrylic acid esters and (iii) about 5 to about 10% by weight of an organic compound containing at least one ethylenically unsaturated group and at least one hydrophilic group; and (d) about 10 to about 50% by weight of an outermost layer formed on the third layer and formed from a polymer having a Tg of 50° C. or higher, the polymer being prepared by polymerizing an ethylenically unsaturated monofunctional monomer.

3. A multilayered polymer according to claim 1 or 2 which comprises (a) about 20 to about 50% by weight of the innermost layer, (b) about 5 to about 15% by weight of the second layer, (c) about 15 to about 30% by weight of the third layer and (d) about 20 to about 50% by weight of the outermost layer.

4. A multilayered polymer according to claim 1 or 2, wherein the ethylenically unsaturated monofunctional monomer used for forming the innermost layer is at least one member selected from the group consisting of alkyl esters of (meth)acrylic acid, (meth)acrylamide, vinyl chloride, vinyl acetate, acrylonitrile, styrene, alkyl vinyl ether, alkyl vinyl ketone, 2-hydroxyalkyl (meth)acrylates and vinylidene chloride, and the multifunctional monomer having at least 2 ethylenically unsaturated groups used for forming the innermost layer is at least one member selected from the group consisting of diesters formed by esterifying both of the terminal hydroxyl groups of ethylene glycol or an oligomer thereof with acrylic acid or methacrylic acid; esters formed by esterifying two hydroxyl groups of a dihydric alcohol with acrylic acid or methacrylic acid; diesters formed by esterifying with acrylic acid or methacrylic acid both of the two terminal hydroxyl groups of bisphenol A or an alkylene oxide adduct of bisphenol A each of which may be substituted with at least one halogen atom; esters formed by esterifying an alcohol having at least 3 hydroxyl groups with acrylic acid or methacrylic acid; compounds formed by ring opening addition of the epoxy group of glycidyl acrylate or glycidyl methacrylate to the terminal hydroxyl groups of a dihydric or polyhydric alcohol; compounds formed by ring opening addition of the epoxy group of glycidyl acrylate or glycidyl methacrylate to a dibasic acid or a halogen-substituted dibasic acid or an alkylene oxide adduct of a dibasic acid or of a halogen-substituted dibasic acid; allyl methacrylate and divinyl benzene.

5. A multilayered polymer according to claim 1 or 2, wherein the ethylenically unsaturated monofunctional monomer used for forming the innermost layer is a monomer mixture containing more than 70% by weight of methyl methacrylate and less than 30% by weight of a monomer selected from the group consisting of alkyl esters of acrylic acid and styrene.

6. A multilayered polymer according to claim 1 or 2, wherein the second layer is formed from a polymer of at least one member selected from the group consisting of an alkyl ($C_1$-$C_{15}$) ester of acrylic acid, 1,3-butadiene, isoprene, 1,3-pentadiene and chloroprene, or is formed from a polymer prepared by polymerizing a mixture of said member and another monomer copolymerizable therewith.

7. A multilayered polymer according to claim 1 or 2, wherein the polyalkylene oxide chain-containing unsaturated monofunctional monomer used for forming the third layer is represented by the formula $$D\text{—}O\text{—}(RO)_n\text{—}X \qquad (1)$$

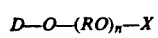

wherein D is a group having an unsaturated double bond, R is an alkylene group having 1 to 4 carbon atoms, n is an integer of approximately 5 to 50, X is a hydrogen atom, a hydrocarbon group having 9 or less carbon atoms, a sulfonic acid group, a carboxylic acid group, a phosphoric acid group or a salt of these acid groups.

8. A multilayered polymer according to claim 1 or 2, wherein the polyalkylene oxide chain-containing unsaturated monofunctional monomer used for forming the third layer is polyethylene glycol (meth)acrylate, methoxypolyethylene glycol (meth)acrylate and polyethylene glycol (meth)acrylate sulfonate, in each of which the polyethylene glycol moiety has about 6 to about 25 repeating units of ethylene oxide.

9. A multilayered polymer according to claim 2, wherein the organic compound containing at least one ethylenically unsaturated group and at least one hydrophilic group used for forming the third layer is at least one member selected from the group consisting of alkyl (meth)allyl sulfosuccinate salts, alkylphenyl (meth)allyl sulfosuccinate salts, sodium styrene sulfonate, ammonium 3-vinyl toluene sulfonate, sodium vinyl sulfonate, sodium (meth)acrylamide alkane sulfonate, sodium 2-sulfoethyl acrylate and sodium 2-sulfoethyl α-ethylacrylate.

10. A multilayered polymer according to claim 2, wherein said at least one monomer selected from the group consisting of conjugated dienes and acrylic acid esters used for forming the third layer is at least one member selected from the group consisting of alkyl ($C_1$-$C_{15}$) esters of acrylic acid, 1,3-butadiene, isoprene, 1,3-pentadiene and chloroprene.

11. A multilayered polymer according to claim 1 or 2, wherein the ethylenically unsaturated monofunctional monomer used for forming the outermost layer is at least one member selected from the group consisting of alkyl esters of (meth)acrylic acid, (meth)acrylamide, vinyl chloride, vinyl acetate, acrylonitrile, styrene, alkyl vinyl ether, alkyl vinyl ketone, 2-hydroxyalkyl (meth)acrylates and vinylidene chloride.

12. A multilayered polymer according to claim 1 or 2, which has a particle size of about 0.05 μm to about 1 μm.

* * * * *